United States Patent [19]

Peranio

[11] Patent Number: 4,948,499

[45] Date of Patent: Aug. 14, 1990

[54] SIMPLIFIED METHOD AND APPARATUS FOR PURIFICATION

[75] Inventor: Anthony Peranio, Nyack, N.Y.

[73] Assignee: Purewater Science International, Inc., Upper Nyack, N.Y.

[21] Appl. No.: 337,668

[22] Filed: Apr. 13, 1989

Related U.S. Application Data

[63] Continuation of Ser. No. 80,751, Jul. 31, 1987, Pat. No. 4,828,692.

[51] Int. Cl.$^5$ .............................................. B01D 24/28
[52] U.S. Cl. .................................... 210/180; 210/186; 210/187; 210/266; 210/467; 210/470; 210/472
[58] Field of Search ............... 210/123, 128, 180, 186, 210/187, 266, 282, 466–472, 482, 267, 660, 661, 667, 669, 687, 738

[56] References Cited

U.S. PATENT DOCUMENTS

| | | | |
|---|---|---|---|
| 1,751,671 | 3/1930 | Webb | 210/267 X |
| 1,834,045 | 12/1931 | Breuil | 210/282 X |
| 2,063,778 | 12/1936 | Andrus | 210/267 X |
| 2,087,136 | 7/1937 | Andrus | 210/669 |
| 2,388,335 | 11/1945 | McCullough | 210/186 X |
| 2,500,134 | 3/1950 | Murray | 210/267 X |
| 2,742,849 | 4/1956 | Stiglitz | 210/186 X |
| 2,781,312 | 2/1957 | Klumb et al. | 210/266 X |
| 2,861,689 | 11/1958 | Lyall | 210/175 |
| 3,369,874 | 2/1968 | Wilhelm | 210/660 X |
| 3,392,837 | 7/1968 | Sanzenbacher | 210/282 |
| 3,430,769 | 3/1969 | Sanzenbacher | 210/266 |
| 3,436,344 | 4/1969 | Canning et al. | 210/39 |
| 3,730,349 | 5/1973 | Herrmann | 210/282 X |
| 3,823,824 | 7/1974 | Close | 210/282 X |
| 3,950,253 | 4/1976 | Stern | 210/282 |
| 4,066,551 | 1/1978 | Stern | 210/282 |
| 4,137,162 | 1/1979 | Mohri et al. | 210/661 |
| 4,171,283 | 10/1979 | Nakashima et al. | 210/679 X |
| 4,172,796 | 10/1979 | Corder | 210/282 X |
| 4,371,442 | 2/1983 | Bals | 210/661 |
| 4,426,285 | 1/1984 | Davis | 210/295 X |
| 4,502,955 | 3/1985 | Schaupp | 210/181 X |
| 4,518,503 | 5/1985 | Fermaglich | 210/180 X |
| 4,578,187 | 3/1986 | Alhäuser | 210/266 X |
| 4,623,457 | 11/1986 | Hankammer | 210/472 X |

FOREIGN PATENT DOCUMENTS

| | | | |
|---|---|---|---|
| 3320065 | 12/1984 | Fed. Rep. of Germany | 210/282 |
| 2392940 | 2/1979 | France | 210/470 |
| 57-035291 | 2/1982 | Japan | 210/660 |
| 59-010384 | 1/1984 | Japan | 210/660 |
| 60-084112 | 5/1985 | Japan | 210/660 |
| 61-082825 | 4/1986 | Japan | 210/660 |
| 61-209573 | 9/1986 | Japan | 210/660 |
| 0418236 | 2/1967 | Switzerland | 210/470 |

*Primary Examiner*—Robert Spitzer
*Attorney, Agent, or Firm*—Louis Weinstein

[57] ABSTRACT

Water purification is performed in a simplified manner within a vessel having at least the lower portion thereof filled with a filtration media such as activated carbon. A spout is provided near the upper end. A filter media placed in the spout. The top of the vessel is closed with a cap which is vented to permit the escape of matter which is vaporized during the heating phase. The vessel preferably has a handle to aid in the dispensing of the purified water. The vessel is preferably formed of a material which is safe for use in microwave heating devices. A valve may be provided at the bottom of the vessel for dispensing purified water directly into a container such as a cooking vessel or beverage maker. In another embodiment the liquid is purified as it rises through the carbon in the container.

8 Claims, 3 Drawing Sheets

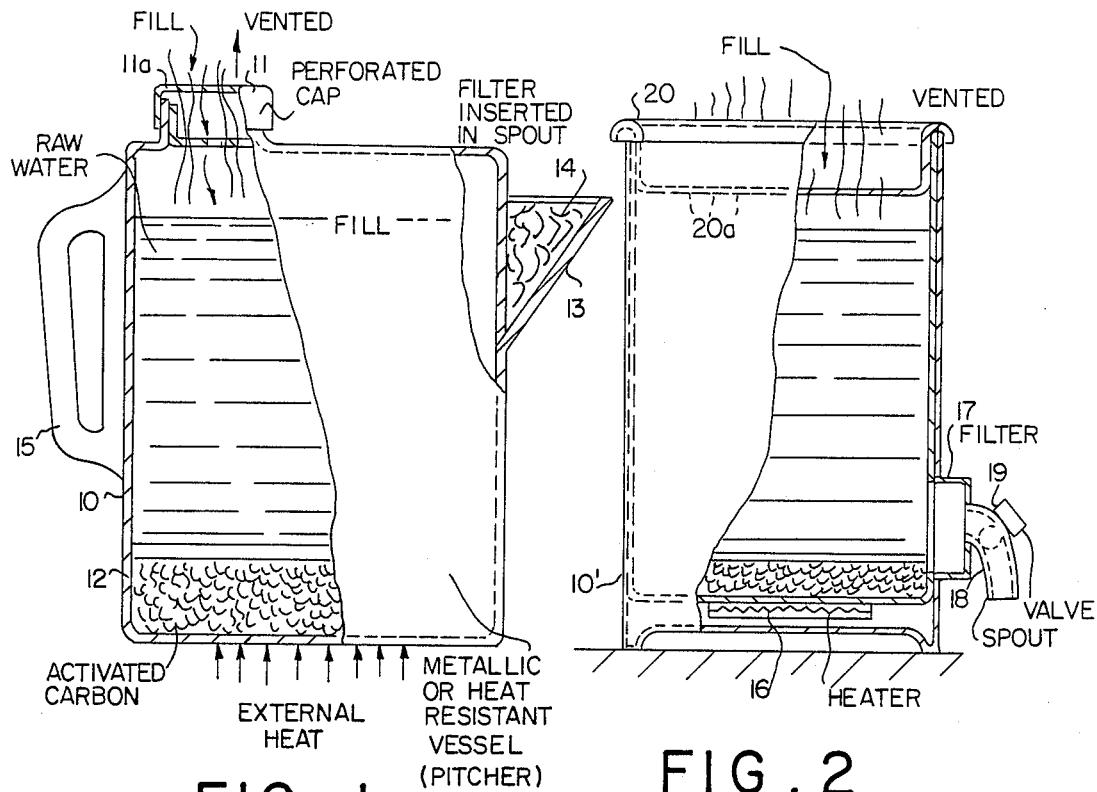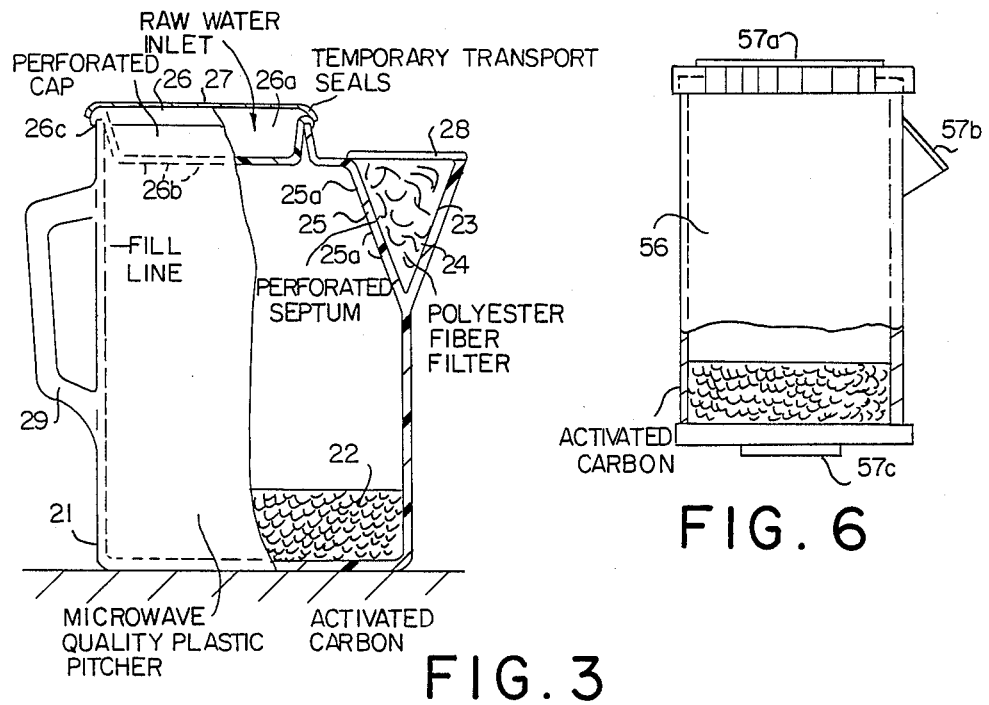

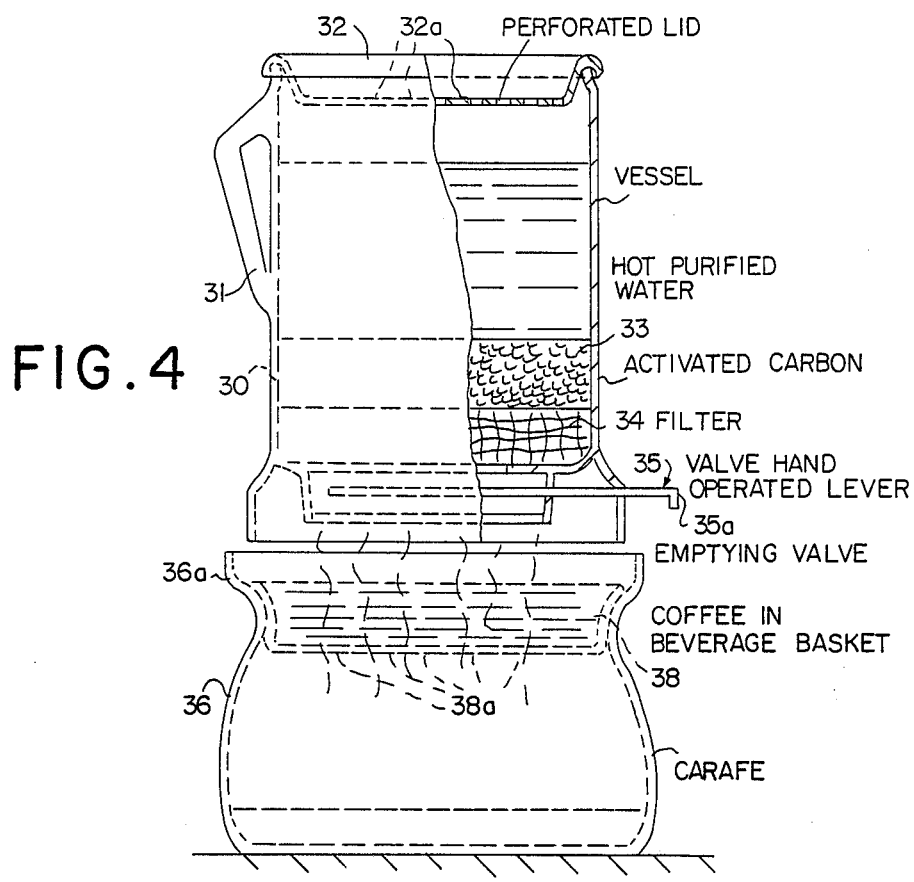
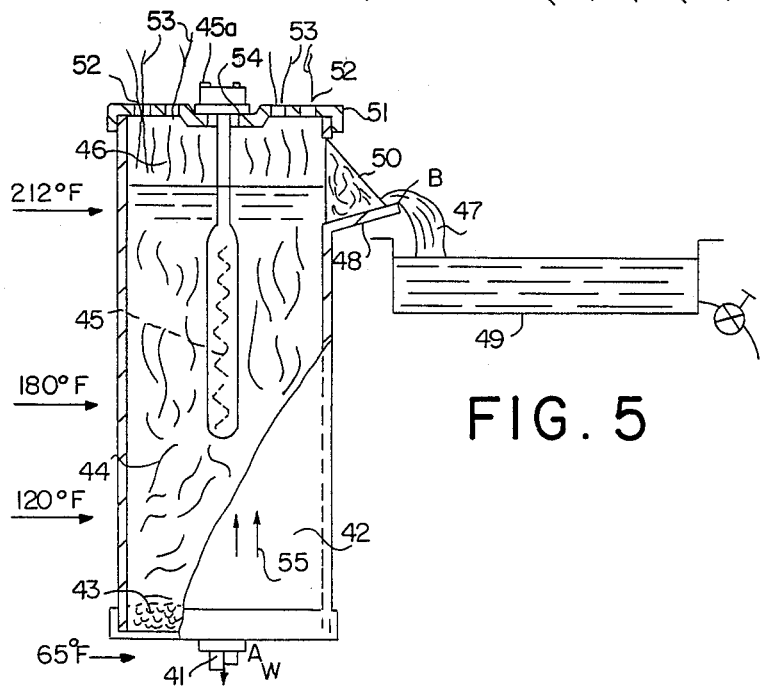

SIMPLIFIED METHOD AND APPARATUS FOR PURIFICATION

This is a continuation of Ser. No. 080,751, filed 7/31/87, now U.S. Pat. No. 4,828,692.

FIELD OF THE INVENTION

The present invention relates to water purification techniques and apparatus and more particularly to method and apparatus for purifying water through a simplified apparatus for concurrently heating and filtering the water under treatment.

BACKGROUND OF THE INVENTION

A number of methods and apparatus for water purification including for example, an invention by one of the inventors of the present application, which invention is the subject of co-pending U.S. patent application Ser. No. 872,162 filed June 9, 1986, now abandoned, and application Ser. No. 054,571 filed May 27, 1987. Although the device and methods described in the aforementioned co-pending applications are admittedly noteworthy, it is nevertheless an objective of the present invention to provide a simpler method and less costly apparatus, especially with respect to manufacturing requirements, and yet which is capable of providing equivalent or better results than the aforementioned inventions.

BRIEF DESCRIPTION OF THE INVENTION

The method and apparatus of the present invention are characterized by comprising a vessel formed from a material capable of withstanding heat to enable the contents thereof to be raised and maintained at the boiling temperature of water and containing activated charcoal for filtering and adsorbing undesirable materials from the water under treatment and further being capable of being described due to the temperature levels present during the operation to enable escape of previously adsorbed toxic matter.

The container is provided with an inlet opening to facilitate the escape of vaporizable matter and is further provided with a pouring spout containing a mechanical filter to capture solid contaminants and other particulate matter which may be contained in the water as the contents of the container are decanted through said spout. The container is capable of being heated either through an internally mounted electric heater, or an external heat source such as a burner, a microwave oven or the like.

The container is filled with a liquid (i.e. water) to the fill line and is heated to bring the liquid to or at the boiling point of water for a predetermined time interval. The boiling water experiences a significant amount of turbulent movement assuring a high level of interaction between the water and the activated charcoal to assure good absorption of constituents within the water being treated by the charcoal. Excellent circulation is obtained due to the thermal energy and convection currents accompanying the heating and boiling process, or additional mechanical pump means may be utilized. Filtration is obtained through the use of the mechanical filter provided adjacent to the outlet spout of the apparatus. The container cover is perforated to facilitate venting of volatilized matter emitted due to vaporization of the water as well as desorption of the adsorbed matter by the activated carbon which is exposed to the same temperatures as the boiling water.

The apparatus may be protected by thin seals which are removed only upon use and which serve to prevent tampering and contamination of the apparatus before use. The seals are removed before use and the apparatus is employed in the same manner as described hereinabove. The apparatus may be formed of relatively inexpensive materials which are nevertheless capable of safe use within a microwave, for example, and which may be disposed of after six or seven months of use.

In still another preferred embodiment of the present invention, the container is provided with heating means arranged in such a way that a temperature gradient is created along the height of the container which is provided with an inlet opening near the bottom thereof and an outlet opening a predetermined distance above the inlet opening. A container is further provided with an open top typically releasably sealed with a vented cover lid. Liquid is introduced into the inlet opening and rises through the container to the level of the outlet opening whereupon the liquid is then dispensed from the outlet opening to a suitable storage tank. The heater, in one preferred embodiment may be suspended from the cover lid so as to extend downwardly into the container to begin heating the contents thereof when the liquid rises to a predetermined level.

A filter is provided over the inlet opening to filter out particulate matter from the liquid as it enters the container. A charge of activated carbon is arranged in the bottom of the container and interacts with the liquid to adsorb undesirable constituents from the liquid during the heating process. The rating of the heater element and the flow rate introduced into the container are selected to assure that the liquid reaches its boiling point at least by the time that the liquid is ready to flow out of the outlet opening. A filter is preferably arranged over the outlet opening to filter any particulate matter still remaining in the liquid before it passes through the outlet opening. The perforated lid releasably covering the container permits the venting of volatilized matter. The cover is also provided with an opening for supporting the enlarged end of the heating element which rests upon the cover, the heating element being connected to the enlarged end in such a manner as to be suspended therefrom and to extend downwardly into the container and preferably be aligned with the longitudinal axis of the container. The axial length and diameter of the container are preferably selected to obtain the temperature gradient described hereinabove.

In still another preferred embodiment of the present invention, the purification apparatus is automated through the use of an electronic control to periodically halt the purification process when the purified liquid, temporarily stored in a holding tank, reaches a predetermined upper level as the liquid in said tank is dispensed. The purification process is reinitiated by float operated switch means which automatically reinitiates liquid flow to the purification container and energization of the heater element to replenish the storage tank with the purified liquid.

All of the above embodiments may be comprised of a prepackaged container assembly covered with removable protective seals to prevent the prepackaged container from being tampered with and to maintain the prepackaged container assembly free of contaminants during the period that the prepackaged container assembly is being stored preparatory to use, said seals being easily removable preparatory to placing the prepackaging container in use.

OBJECTS OF THE INVENTION AND BRIEF DESCRIPTION OF THE FIGURES

It is therefore one object of the present invention to provide novel method and apparatus for water purification in which both heating and mechanical filtration are obtained to achieve desired purification levels.

Still another object of the present invention is to provide novel inexpensive water purification apparatus of the character described herein and wherein the said apparatus is usable in a microwave heating device.

Still another object of the present invention is to provide a novel and yet highly simplified water purification apparatus in which heating, adsorption of undesirable matter and mechanical filtration are provided in a highly simplified and inexpensive apparatus.

The above as well as other objects of the present invention will become apparent when reading the accompanying description and drawing in which:

FIGS. 1 through 4 show elevational views, partially sectionalized of preferred embodiments of the present invention. FIGS. 1 and 3 showing an embodiment having pouring spouts, FIG. 2 showing an embodiment having a spout provided with a dispensing valve and FIG. 4 showing an embodiment useful for both water purification and beverage brewing.

FIG. 5 shows a sectional view of still another embodiment of the present invention for providing a substantially continuous flow of purified water.

FIG. 6 shows an elevational view of a prepackaged purifier unit usable with the apparatus shown in FIG. 5.

DETAILED DESCRIPTION OF THE INVENTION AND THE PREFERRED EMBODIMENTS THEREOF

Figure 7:
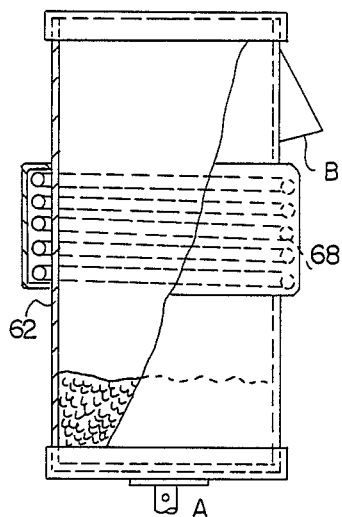
FIG. 7 shows a partially sectionalized elevational view similar to that shown in FIG. 5 and employing an alternative heating apparatus.

The method of the present invention comprises the following steps:

1. Mixing the water to be treated with activated carbon alone or activated carbon mixed with other material that are effective in water treatment, for example, ion exchange resin(s);
2. Applying heat so that the water/carbon mixture reaches a temperature of 212° F. at standard atmospheric pressure (sea level) within several minutes time and then boiling the mixture for five minutes or so;
3. Filtering the mixture through a filter, either when hot or after cooling; and
4. Collecting the water for drinking, cooking or other use requiring purified water.

Although the basic four step process described hereinabove employs techniques well known in the art of water purification, the interrelationship and integrated methodology of these techniques into a simplified apparatus has not heretofore been provided.

Due to the simplicity of the method of the present invention, the means by which the method can be practiced include a large number of combinations of the several necessary components and factors which may also include the following:

1. Mixing the water to be heated with purification agents. This is accomplished simply by placing the activated carbon, and activated carbon together with other agents if and when required, in an open vessel, pouring the raw water to be treated over the purifying agent and mixing the water and activated carbon.
2. Heat can be applied either outside of the vessel from a gas flame or an electric resistance heater or through a microwave apparatus or by induction heating. Alternatively, an electric resistance or other heater apparatus may be placed inside the vessel.

In order to obtain a desired circulation, the water/purifying agent mixture obtains circulation due to the thermal energy (and convection currents) accompanying the heating and boiling process. However, the circulation means can be enhanced and controlled (as the rate of flow) by use of mechanical pumping means.

The filtration apparatus can be as simple as a stage of fine polyester fibers forming a non-woven pad through which the treated water mixture is poured after heating and flows by gravity through the filter pad during which particulate matter is thereby removed. Alternatively, the filter may comprise one or more stages of mechanical and porous material filters through which the treated water mixture flows either by gravity or under control of a pump or hydraulic pressure.

Particular embodiments of the invention and the embracing of the above capabilities will now be considered.

FIG. 1 shows a pitcher-shaped vessel preferably formed of a material suitable for withstanding heat without being deformed or otherwise degraded. For example, the pitcher may be formed of stainless steel, glass or ceramicware and is designed to be heated typically at the bottom by an external source of heat such as a gas flame or an electrical resistance heater.

Vessel 10 is provided with a large cap 11 that is perforated as shown at 11a so as to serve as the means for adding raw water to be treated to the "fill level" and as a means for venting gases and vapors, which are produced during the purification process, to the atmosphere.

A portion of the pitcher contents is provided with activated carbon. For example, assuming a 2.5 liter vessel is employed, a charge of 500 cc of activated carbon granules is initially loaded into the vessel to occupy the lower portion thereof. Vessel 10 is then filled with raw water to be purified to a predetermined level. Heat is applied at a level sufficient to bring the mixture to the boiling point within several minutes whereupon heating is continued for approximately 5 more minutes, and then halted.

Pitcher 10 and its contents can then be allowed to cool or, while still hot, the pitcher can be safely tilted by using handle 15 and purified water may be decanted from the pitcher through a mechanical filter 14 arranged within the pitcher spout 13. The filter is preferably formed of lightly compressed polyester fibers. The filter substantially completely fills the spout 13 to prevent the activated carbon 12 as well as materials precipitated out of the water, from leaving the vessel with the purified water.

The above purification process can be repeated in the apparatus of FIG. 1 a large number of times before the effectiveness of the carbon is exhausted. For example, when treating a typically "hard" municipally supplied tap water (containing, for example, 350 ppm dissolved minerals) at least 300 vessel volumes of pure water can be treated (about 150 to 200 gallons) over a period of four months for use by an average family.

To recharge, the spout filter 14 is removed and disposed of along with the spent carbon 12, the vessel is cleaned and a fresh spout filter and activated carbon are added for preparation for subsequent use.

FIG. 2 shows a variation of the embodiment of FIG. 1 which is suitable for use on a counter top or for mounting beneath the kitchen cabinet. In the embodiment shown therein, heat is applied to vessel 10' by an electric resistance heater 16 thermally coupled to the bottom of the vessel while being internal of the housing. A filter, 17 is arranged near the bottom of vessel 10' and covers spout 18 to assure removal of particulate matter when valve 19 is opened. The operation of the embodiment of FIG. 2 is substantially the same as that shown in FIG. 1. If desired, the perforated, cover 20 may be removed to fill container 10' or alternatively the liquid may be poured directly upon the recessed lid portion 20a of the lid.

FIG. 3 shows still another embodiment of the present invention which is suitable for heat treatment utilizing microwave energy as provided typically by microwave ovens, for example. Vessel 21 may, for example, be a 2 liter pitcher formed of a water and food contact quality plastic suitable for microwave oven use. This embodiment is intended to be discarded after purifying a total quantity of the order of 200 gallons or more whereby both the pitcher and its spent contents (filters and carbon) are discarded and replaced by a newly purchased pitcher.

The disposable type pitcher is loaded with approximately 500 cc of activated charcoal granules 22. A polyester fiber pad 23 of approximately 1.50 inches thickness is provided in spout 24 which filter is separated from the main portion of the container by a perforated septum 25 having openings 25a.

Recessed cap 26 has a recessed portion 26a provided with perforations 26b. A temporary transport seal 27 is preferably adhesively affixed to the annular lip 26c of cap 26 and a second such seal 28 is adhesively affixed to the opening and spout 24 to prevent tampering and contamination of the throw away assembly. The seal may be a thin sheet of paper or metal foil adhesively adhered to the container.

In order to purify water, the temporary seals 27 and 28 are removed, the pitcher is filled with raw water either directly through the recessed cap or by temporarily removing the cap, filling container 21 with water and snapping cap 26 back into position. The unit shown in FIG. 3, together with the water contents is lifted by handle 29 and is placed in a microwave oven for 15 to 20 minutes (depending upon the output power of the microwave unit). The contents of the pitcher undergoes at least several minutes of boiling during the aforesaid time interval. After heat treatment the water is poured out of the pitcher and may be used for hot beverages, or if the pitcher and contents are allowed to cool, the warm water can be poured into a refrigerator jar for cooling. Alternatively, if desired the entire unit shown in FIG. 3 can be placed in a refrigerator.

The embodiment of FIG. 3 is contemplated for approximately 3 to 6 months of use, depending upon raw water hardness and quality for treating a total quantity of water on the order of 200 gallons.

FIG. 4 shows still another embodiment of the present invention which is useful as both a raw water purifier and beverage maker. In this embodiment, activated carbon 33, a bottom filter 34 and emptying valve assembly 35 are provided at the bottom of vessel 30 which may, for example, be of the microwave type. Vessel 30 is filled by removing lid 32. The perforations 32a in lid 32 allow the escape of contaminants.

After heating and boiling in the microwave oven, the vessel is lifted by handle 31 and placed on the beverage carafe 36 as shown, so as to be supported upon the upper open end 36a of the carafe. A basket 38 may, for example, contain coffee through which the purified water percolates further passing through perforations 38a in basket 38 in order to collect the purified water which has now extracted the aromas and flavors of the ground coffee. The hand-operated lever 35 is pulled to the right relative to FIG. 4, for example, by gripping handle portion 35a, to open the valve and allow the heated, purified water to pass into the beverage basket 38.

The above embodiments accomplish the following objectives:

1. The raw water is heat sterilized to destroy substantially all forms of vegetative bacteria.

2. The activated carbon sufficiently adsorbs most species or toxic organic contaminants.

3. Heavy toxic metals are significantly reduced in concentration.

4. Temporary hardness is removed, when contained in the raw water.

5. Colors, odors and unwanted gases are removed and/or significantly reduced.

6. Due to the heating of the carbon during the purification operation, the activated carbon is stripped or desorbed of the more volatile toxic materials which are safely vented to the atmosphere and thereby removed from the water being purified, thereby leaving the carbon pores free to adsorb significantly more than the usual amount of heavy molecular weight contaminants (such as pesticides and PCB's, for example), thus making highly efficient use of the carbon.

7. The contact "residence" time of the raw water being treated is very high (10 minutes or greater) as compared with the low residence times of activated carbon employed in once-through filters.

8. Raw water purified by the method and apparatus of the present invention may be utilized to produce hot (and cold) beverages of excellent aesthetic, physical and chemical quality.

The embodiments described hereinabove are excellent for use for batch processing of contaminated water. The embodiments to be described hereinbelow are capable of providing continuous flow purification of contaminated water and may be built in a wide range of sizes extending from small household units capable of treating as little as a gallon of water per hour to much larger units for commercial and industrial application which may require a water purification capability of hundreds of gallons per hour.

The embodiments to be described herein utilize an opened topped (or vented) vertical water purification system containing activated carbon or a mixture of activated carbon and other water treatment and purification chemicals, the volume of the activated carbon (and other chemicals if present) constituting about one-third of the total volume of the vertical water purification vessel.

Contaminated water to be purified is introduced at a constant and small flow rate at or near the bottom of the purification vessel. The path of movement of the water is vertically upwards through the activated carbon which is arranged at the bottom of the vessel.

During passage through the vessel, the water being purified is heated so that by the time it is discharged at the top of the vessel it has reached its boiling temperature which is about 212° F. (at usual sea level barometric pressure).

The specific flow rate is selected to meet the following two requirements:

1. The residence time of water being purified in the purification vessel which is the time required for the water to move from the bottom inlet to the top outlet, is of the order of 10 to 20 minutes; and 2. The temperature of the water being purified in the upper portion of the vessel is about 212° F. when the water is ready to leave the vessel.

Mechanical filters are provided at both the inlet and outlet of the vessel in order to prevent solid particles from penetrating into the purification vessel and to keep fine solid particles of carbon and precipitated materials from passing out of the vessel. The above objectives and functions will now be considered in conjunction with specific embodiments of the invention.

FIG. 5 shows a partially sectionalized view of water purifying apparatus for providing water on a continuous basis according to the method of the present invention.

Raw, contaminated water W enters under pressure through conduit 41 at a point marked "A" which is the inlet to the water purification apparatus at the lower end of purifier vessel 42. The raw water W passes upwardly through a porous mechanical filter 43 arranged in the bottom portion of vessel 42 and continues to fill vessel 42 moving slowly upwardly through a bed of activated carbon particles 44 which occupy a volume in the order of 30 to 40 percent of the total volume of vessel 42. The carbon particles are typically in the range of from 20 to 50 mesh or so.

An elongated electrical resistance heater 45 is placed within the vessel so that its longitudinal axis substantially coincides with the central axis of vessel 42 and is arranged so that the thermal energy of the resistance heater is released substantially in the upper half of the vertical vessel so that the part of the heater that releases maximum heat is always below the upper water level 46 of the water being purified as it passes through the vessel and is dispensed therefrom in a manner to be more fully described. The upper end 45a of heater 45 rests upon the marginal portion of lid 51 surrounding opening 54.

During operation, the purified water 47, after it has risen to a predetermined upper level, flows out of spout 48 at the point marked "B" and into a collection tank 49. A porous mechanical filter 50 is arranged to fill spout 48 to prevent any fine particles of activated carbon and precipitated material as well as any other particles from flowing out of container 42 together with the purified water stream 47.

Vented cap 51 is mounted over the open upper end of vessel 42 which cap is provided with the number of openings 52 for allowing easy venting of steam and other vapors 53 into the atmosphere. A properly sized opening 54 is centrally located within cap 51 to allow the heater 45 to be inserted into (and removed from) the vessel 42 and to be both centered and supported by vented cap 51.

The temperature values arranged along the left-hand vertical side of vessel 42 represent the average temperature of the water in the vessel at that particular level. It can be seen that a temperature gradient exists from the bottom to the top of the container. For example, it can be seen that inlet water is typically about 65° F. and that its temperature, along with the temperature of the carbon, is gradually raised until, at the topmost or surface level 46, the water temperature has already reached 212° F. and steam and other vapors 53 emanating from the water surface 46 pass through the upper open area of container 42 and are vented through openings 52 in top cover 51.

To initiate operation of the apparatus shown in FIG. 5, raw water is introduced through conduit 41 at a rate allowing the water to rise slowly. Once heater element 45 is covered with water it can be activated without danger of damaging or burning out the heater element. Flow into the vessel is stopped when the raw water reaches the uppermost level 46. Heating of the water (and carbon) is continued until the water in vessel 42 begins to boil.

At this point the flow of raw water delivered to conduit 41 is reestablished and the process allowed to proceed as described hereinabove in order to provide continuous operation. However, at the initial start-up operation, it is preferable to discharge the first few volumes of water since this water may contain all the contaminants previously held by the unused components of the water purifier system; that is contaminants in the new filters, in the carbon and on the surfaces and piping of the system. The initial heating is required to insure that all parts are sterilized and that the water 47 thereafter collected is safe for human consumption and other sanitary uses.

It should be noted that the carbon 44 will settle in the lower, cooler end of vessel 42 and will accumulate and be relatively undisturbed by the current of rising water since the velocity of the water is quite small, being of the order of 1.67 inches per minute.

However, in the upper region of the vessel where the thermal energy of heater 45 is released, strong thermal convection currents are formed and flow in the direction indicated by arrows 55. The convection currents are of sufficient energy, velocity and turbulence to stir up a significant portion of the activated carbon granules, driving the granules into the upper part of the vessel 42 and assuring their efficient contact and interaction of the carbon granules with the water and contaminants carried by the water.

Vigorous boiling occurs in the upper end of vessel 42 causing the carbon particles moved by the strong convection currents to be desorbed of their charge of volatile organic contaminants which are volatilized and expelled into the air space above the surface 46 and continue to rise until they are vented into the atmosphere, along with the steam vapors, through openings 52. All vegetative forms of bacteria are killed during this treatment.

If minerals causing temporary hardness are present, they—along with other chemicals that become less soluble due to the heat—are precipitated out and trapped inside the vessel.

It should be understood that the embodiments of the present invention can be produced in a number of sizes and shapes such as purifier units having vessels with a capacity of one or two liters (about 1 to 2 quarts) for providing purified water at the rate of about 2 gallons per hour. Medium sized purifiers having vessels whose capacity is 2 or 3 gallons can provide purified water at the rate of about 10 to 15 gallons per hour which is suitable for restaurants or institutional use, for example. On the other hand, large size purifiers having vessels with a 50 gallon fluid capacity (and above) will provide purified water at the rate of 250 gallons per hour (or more).

A medium size water purifier apparatus may, for example, have a fluid capacity of 10 liters (about 2.5 gallons), i.e. the volume of water contained between point "A" and point "B". Vessel 42 may be formed of a plastic material whose vertical height is 50 centimeters (approximately 20 inches) and whose internal diameter is 16.7 centimeters (about 6.6 inches).

Raw, contaminated water, is delivered through the inlet conduit 41 at a rate of about 50 liters per hour (about 12.5 gallons per hour). About 95 percent or more of the flow or 45 liters per hour will flow out as purified water through the spout 50.

The residence time of raw water in vessel 42 is determined by dividing the 10 liter volume by the flow rate of 50 liters per hour or one-fifth of an hour (12 minutes), in this case.

3 liters of activated carbon granules are loaded into the vessel. To bring the water to a boil in about one-half the total residence time of water in the vessel (6 minutes) and considering about 15 percent heat lost to the surroundings, the heating requirement is fulfilled with an electrical heating element of about 5.0 kilowatts. The energy cost for producing purified water is about 4 cents per gallon considering electricity at a cost of 10 cents per kilowatt-hour.

Another alternative embodiment of the present invention is shown in FIG. 6 which embodiment is particularly suited for small and medium size water purifiers.

An entire water purifier unit 56, with the exception of the heater element, is prepackaged and sealed for shipping to the consumer for use. The operator need simply: remove the temporary tamper proof seals 57a, 57b, 57c; connect the opening in the bottom of container 56 covered by temporary seal 57c with conduit 41; fill the container with water up to the desired level; and place the heater element in the position as shown in FIG. 5. Prepackaged unit 56 contains a fresh charge of activated carbon and two fresh porous filters such as the filters 43 and 50 arranged respectively at the bottom and spout of the container as shown in FIG. 5.

Considering unit 56 as being designed for use in the home, after purification of the order of 200 gallons of water or when the unit has been in service for about 6 months, which ever occurs first, the prepackaged unit may be discarded and replaced by a fresh prepackaged unit. Medium size and large size units may be removed from the apparatus and returned to the supplier for recharging.

FIG. 7 shows still another alternative embodiment of the present invention which utilizes a stainless steel vessel 60. An electrical resistance heater 68 is placed about the outer periphery of vessel 60. The apparatus shown in FIG. 7 will operate in a similar manner to that shown in FIG. 5 and will accomplish the same beneficial effects attributed to the previous embodiments.

As another alternative heating technique, the arrangement shown in FIG. 7 may be modified in that vessel 62 may be formed of a plastic material and the heating unit 68 may be a microwave cage or other form of induction heater wherein the container is provided with suitable conventional means to heat the liquid by induction.

Figure 8:
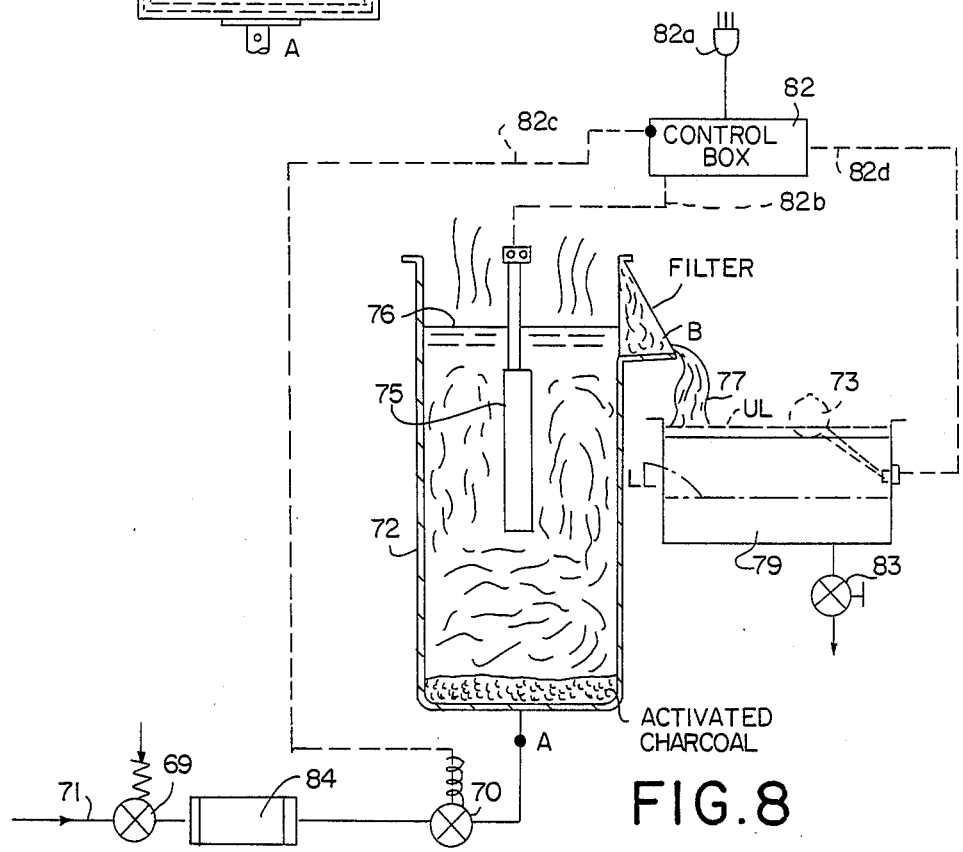
FIG. 8 shows a schematic view of apparatus similar to that shown in FIG. 5 in which the operation is substantially automated.

FIG. 8 shows an automatic operating system for providing purified water on demand and according to need.

Raw water enters through conduit 71 and is fed under pressure through flow regulator valve 69 to provide a constant, predetermined flow of raw water through solenoid operated valve 70 in order to enter through inlet A of vessel 72.

Heater 75 is energized only when water has reached upper level 76. Purified water 77 is delivered to storage tank 79 in the same manner as was previously described. However, when storage tank 79 is nearly filled with purified water (reaching upper level UL) solenoid valve 70 is closed under control of float-operated switch assembly 73.

Purified water is drawn from storage tank 79 by valve 83. When the purified water in storage tank 79 drops to the lower level LL float valve operated switch 73 operates solenoid controlled valve 70 through control box 82, which is typically provided with power from a local power source coupled thereto by plug 82a. Control box 82 also reenergizes heater 75 through the electrical connection shown by dotted line 82b, switch assembly 73 and solenoid controlled valve 70 being connected to control box 82 by leads 82d and 82c respectively.

Using the arrangement shown in FIG. 8, the water purification system produces purified water only as it is needed, automatically and with a certain volume of purified water maintained as a back-up quantity in storage tank 79.

Particular specialized treatment of water may be required before reaching vessel 72 of the water purifier apparatus in certain applications. This may be accomplished, by providing purification assembly 84 which may for example, be a stage of de-ionization employing specialized resins for that purpose or alternatively, assembly 84 may be a stage of chemical treatment that addresses itself to removal of particularly high concentrations of a certain mineral or other contaminant.

In the majority of applications for treating raw water and municipally supplied water, the embodiments described above provide adequate cost effective apparatus which is satisfactory for producing water that is safe to drink.

In addition, the above embodiments achieve the following desirable effects using activated carbon as the reagent in the purification vessel:

1. Contaminated raw water is sterilized by heating in order to destroy all forms of vegetative bacteria;

2. The activated carbon efficiently adsorbs most species of toxic organic contaminants;

3. Undesirable high concentrations of toxic heavy metals are significantly reduced in concentration;

4. Temporary hardness is removed when present in the raw water;

5. Colors, odors and unwanted gases are removed and significantly reduced;

6. The heating phase of the purification operation strips or desorbs the activated carbon of the more volatile toxic materials which are safely vented from the apparatus and thereby removed from the water being purified leaving the carbon pores free to adsorb greater than the usual amount of heavy molecular weight contaminants (such as pesticides and PCB's, for example), thus making more highly efficient use of the carbon;

7. The contact and "residence" time of the raw water within the apparatus and specifically with the carbon, is quite high (10 minutes or more) compared with the low residence time of activated carbon filters in which the water being filtered passes through rapidly only once;

8. Raw water purified by the method of and using the means described in the present invention produces hot (and cold) beverages of excellent aesthetic, physical and chemical quality;

9. If the activated carbon is mixed with ion exchange resins, for example, or when the raw water is pretreated with such resins then contaminated water will be stripped of virtually all of its minerals and thereby "softened" in addition to the purification steps already described hereinabove.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein detailed.

What is claimed is:

1. Apparatus for purifying a liquid comprising:
a hollow unitary container defined by a bottom and an integral sidewall and having an open top for introducing a liquid into the container and a spout at the top open end of said container;
a predetermined quantity of carbon being positioned in said container and being loosely arranged in the bottom portion of the container prior to heating the container and being arranged to freely move into the upper region of the container and mix with the liquid placed in said container;
a filter positioned in said spout to remove particulate matter from the liquid as the liquid containing such particulate matter passes through the spout and to prevent the carbon from passing through said filter;
said container being formed of a material capable of withstanding heat sufficient to raise the temperature of the liquid contents to about the boiling level whereby the contents are caused to interact with the carbon during heating and drive the carbon particles into the upper portion of the container to intimately interact with the heated water;
said container being provided with a lid removably covering said open top; and
said lid being perforated, said perforations being sufficient to permit venting of volatile matter from the container during heating.

2. The apparatus of claim 1 wherein said container is further provided with a handle to facilitate lifting of said container, said handle being formed of a material for insulating the holder's hand from the elevated temperature of the contents of said container.

3. The apparatus of claim 1 wherein at least a portion of said lid having said perforations is recessed to permit liquid to be collected thereon as the container is being filled to facilitate filling of the container without removal of the lid.

4. The apparatus of claim 1 wherein the bottom of the container is provided with a compartment defining an enclosed region;
an electrical resistance type heater being provided in said enclosed region for heating the contents of said container.

5. The apparatus of claim 1 further comprising first and second sealing means provided over said lid and the opening of said spout for releasably sealing the contents of the container.

6. The apparatus of claim 5 wherein said sealing means is comprised of a thin sheet of material having an adhesive-like material for releasably affixing the sealing means to the container.

7. The apparatus of claim 1 wherein the bottom of the container is provided with an opening;
manually operable valve means positioned to seal said bottom opening and movable between an open and closed position for selectively dispensing the contents of the container through said bottom opening.

8. The apparatus of claim 7 further comprising a second filter which substantially covers the opening in the bottom of the container.

* * * * *